United States Patent
Kiely et al.

(10) Patent No.: US 10,002,631 B1
(45) Date of Patent: Jun. 19, 2018

(54) HEAD-MEDIUM CONTACT DETECTION USING A THERMAL SENSOR HEATED BY MULTIPLE HEAT GENERATING COMPONENTS OF A SLIDER

(71) Applicant: Seagate Technology LLC, Cupertino, CA (US)

(72) Inventors: James Dillon Kiely, Edina, MN (US); Zhen Wei, Maple Grove, MN (US); Neil Zuckerman, Eden Prairie, MN (US); John Charles Duda, Bloomington, MN (US); Eric L. Montei, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/631,489

(22) Filed: Jun. 23, 2017

(51) Int. Cl.
G11B 21/02 (2006.01)
G11B 5/60 (2006.01)

(52) U.S. Cl.
CPC ............ G11B 5/607 (2013.01); G11B 5/6076 (2013.01)

(58) Field of Classification Search
CPC ..... G11B 5/6076; G11B 5/314; G11B 5/3116; G11B 5/3133; G11B 5/3136; G11B 5/607; G11B 2005/0021; G11B 5/59633; G11B 5/54

USPC ................... 360/75, 59, 313, 324, 326, 328; 369/13.13, 13.32, 13.33
See application file for complete search history.

(56) References Cited

U.S. PATENT DOCUMENTS

| | | | |
|---|---|---|---|
| 8,830,614 B2 | 9/2014 | Garzon et al. | |
| 8,995,076 B1 | 3/2015 | Olson et al. | |
| 9,030,773 B2 | 5/2015 | Macken et al. | |
| 9,093,084 B2 | 7/2015 | Peng et al. | |
| 9,202,499 B2 * | 12/2015 | Kiely | .................... G11B 5/3116 |
| 9,607,642 B1 | 3/2017 | Yang et al. | |
| 2007/0127147 A1 | 6/2007 | Yokohata et al. | |
| 2014/0269819 A1 | 9/2014 | Kiely et al. | |
| 2015/0062754 A1 | 3/2015 | Peng et al. | |

* cited by examiner

*Primary Examiner* — Nabil Hindi
(74) *Attorney, Agent, or Firm* — Hollingsworth Davis, LLC

(57) ABSTRACT

An apparatus comprising a slider and a detector coupled to the slider. The slider is configured for writing data to and reading data from a magnetic recording medium. The slider comprises a heater configured to receive a modulated signal and cause oscillation in a spacing between the slider and the medium. At least one heat generating component of the slider is configured to receive a modulated signal. A contact sensor is situated on the slider to receive heat generated by the at least one heat generating component. The detector is configured to measure a response signal of the heated contact sensor as the slider approaches the medium. The detector is further configured to detect contact between the slider and the medium in response to the response signal reaching a predetermined threshold.

20 Claims, 8 Drawing Sheets

HEAD-MEDIUM CONTACT DETECTION USING A THERMAL SENSOR HEATED BY MULTIPLE HEAT GENERATING COMPONENTS OF A SLIDER

SUMMARY

Embodiments are directed to a method comprising moving a magnetic recording slider relative to a magnetic recording medium. The method comprises supplying a modulated signal to a heater of the slider to cause an oscillation in a spacing between the slider and the medium. The method also comprises supplying a modulated signal to at least one supplemental heat generating component of the slider, and heating a contact sensor of the slider using the heater and the at least one supplemental heat generating component. The method further comprises measuring a response signal of the heated contact sensor as the slider approaches the medium, and detecting contact between the slider and the medium in response to the response signal reaching a predetermined threshold.

Embodiments are directed to an apparatus comprising a slider and a detector coupled to the slider. The slider is configured for writing data to and reading data from a magnetic recording medium. The slider comprises a heater configured to receive a modulated signal and cause oscillation in a spacing between the slider and the medium. At least one heat generating component of the slider is configured to receive a modulated signal. A contact sensor is situated on the slider to receive heat generated by the heater and the at least one heat generating component. The detector is configured to measure a response signal of the heated contact sensor as the slider approaches the medium. The detector is further configured to detect contact between the slider and the medium in response to the response signal reaching a predetermined threshold.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
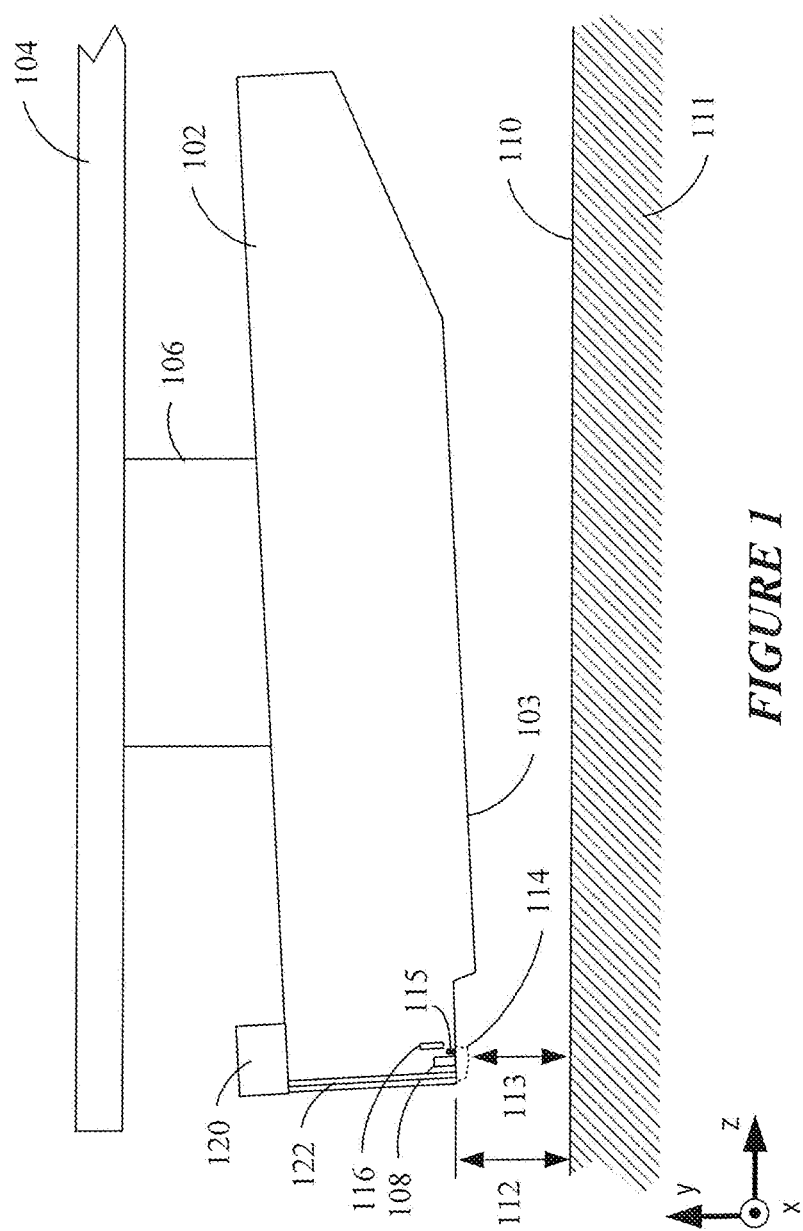
FIG. 1 shows a side view of a magnetic recording slider with which embodiments of the present disclosure can be implemented.

A transducer of a magnetic storage device includes components for recording information to and reading information from a magnetic recording medium. The transducer is usually housed within a small ceramic block called a slider. Sliders are aerodynamically designed to fly on a cushion of air that is generated due to rotating a magnetic recording disk at high speeds. The slider has an air bearing surface (ABS) that may include rails and a cavity or depression between the rails. The ABS is that surface of the slider nearest to the disk as the disk is rotating. Air is dragged between the rails and the disk surface causing an increase in pressure that tends to force the head away from the disk. Air is simultaneously rushing past the cavity or depression in the ABS which produces a lower than ambient pressure area at the cavity or depression. The low-pressure area near the cavity counteracts the higher pressure at the rails. These opposing forces equilibrate so the slider flies over the surface of the disk at a particular fly height. The fly height is the distance between the disk surface and the slider's ABS surface. During operation of a hard disk drive, the distance between the slider and the disk is very small, on the order of several nanometers.

For accurate write and read operations to occur, it is desirable to have a relatively small distance or spacing between a slider and its associated magnetic recording medium. This distance or spacing is known head-medium spacing, which is interchangeable with the term fly height. By reducing the fly height, a slider is typically better able to both write and read data to and from a medium. Reducing the fly height also allows for surveying of recording medium topography, such as for detecting asperities and other features of the recording medium surface. Head-medium contact detection and/or head-medium spacing sensing technologies contribute to the performance and reliability of magnetic storage systems. Higher contact detection repeatability enables lower active clearance, and thus higher recording density. Higher contact detection sensitivity reduces wear and improves reliability.

Good performance of the head disk drive results when a slider is flown as closely to the surface of a disk as possible. An important function of a hard disk drive is to accurately set the clearance between the slider and the surface of the magnetic storage medium. Toward this end, various techniques have been developed to set clearance that involve incrementally reducing fly height of the slider until contact is made between the slider and the recording medium. Once contact is made, an appropriate clearance is set such that slider is made to fly close to, but spaced apart from, the surface of the recording medium during operation.

Contact detection may be performed before the slider-medium system begins any type of recording. Contact detection may be performed on a head-by-head basis and can require significant interaction time between head and disk. Today, many systems implement a contact detection scheme which involves determining the heater power necessary to cause thermal expansion of the slider from a passive fly condition to intermittent slider-medium contact. This intermittent contact may cause significant modulation of the slider fly height. The modulation of slider fly height then results in modulation of heat transfer between the head and disk. A contact sensor, such as a dual ended temperature coefficient of resistance (DETCR) sensor, can readily pick up these relatively large fluctuations in slider-medium heat transfer. The readings from the contact sensor in combination with the heater power can be used to establish contact detection.

However, newly developed low clearance technology (LCT) head-medium systems have reduced or eliminated fly height modulation due to intermittent slider-medium contact. The reduction/elimination of fly height modulation has beneficially resulted in the reduced wear of the slider during contact detection and unintended slider-medium interaction. However, it has also resulted in the reduction of contact detection strength by the sensors and/or techniques that rely on the fly height modulation. As such, in response to the contact detect challenges presented by LCT slider-medium systems, a low-frequency AC heater (LFACH) contact detect scheme has been developed. In LFACH, the amplitude of the heater voltage/power follows an oscillation that causes the slider fly height to follow the same oscillation. A contact sensor in the slider detects the oscillation and produces an oscillating sensor signal, which when combined with the heater power can be used to determine the contact detect.

According to various embodiments, the method of operation of LFACH is by oscillating the heat input(s). This often brings significant oscillations in clearance. Oscillations in clearance will cause oscillating changes in ABS pressure and ABS heat transfer. Oscillations in heat input to the contact sensor (e.g., DETCR), due to heaters or other sources, will also have a separate but complementary effect. As the DC power applied to the heater changes, and the clearance and ABS pressure change in controlled steps, the amplitude of the DETCR R(t) response to a given oscillating heat source will change in a detectable way at each "DC" step. This change in R(t) will be greater when more heat is delivered to the DETCR. This effect can occur even without an oscillation in clearance or without an oscillation in surface heat transfer coefficient.

Embodiments of the disclosure are directed to detecting contact between a slider and a magnetic recording medium, such as by use of an LFACH contact detection technique. Embodiments are directed to improving the response of a contact sensor by heating the contact sensor using at least one heat generating component of the slider in addition to the main heater of the slider that is used for contact detection. Some embodiments are directed to improving the response of a contact sensor by heating the contact sensor using more than one heat generating component of the slider in addition to the main heater of the slider that is used for contact detection. According to some embodiments, one or more heat generating components of the slider are modulated synchronously with the main heater that is used for contact detection. According to other embodiments, one or more heat generated components of the slider are modulated asynchronously or phase-delayed relative to the main heater that is used for contact detection. The response of the heated contact sensor is measured by a detector configured to detect contact between the slider and a recording medium.

FIG. 1 shows a side view of a slider 102 configured for magnetic recording according to a representative embodiment. In some embodiments, the slider 102 is configured for heat-assisted magnetic recording (HAMR). The slider 102 may be used in a magnetic data storage device, e.g., a hard disk drive (a conventional or HAMR disk drive). The slider 102 is coupled to an arm 104 by way of a suspension 106 that allows some relative motion between the slider 102 and arm 104. The slider 102 includes read/write heads 108 at a trailing edge that are held proximate to a surface 110 of a magnetic recording medium 111, e.g., magnetic disk. In HAMR embodiments, the slider 102 further includes a laser 120 and a waveguide 122. The waveguide 122 delivers light from the laser 120 to components (e.g., a near-field transducer) near the read/write heads 108.

When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface 103 (also referred to as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a "close point" of the slider 102, which is generally understood to be the closest spacing between the read/write heads 108 and the magnetic recording medium 111, and generally defines the head-to-medium spacing 113.

To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116. A contact sensor 115 is shown situated at or near the close point 114 (e.g., adjacent the read/write heads 108, such as near the write head) or can be positioned at another location of an air bearing surface (ABS) 103 of the slider 102.

According to various embodiments, a contact sensor of a slider can have a resistance that changes as a function of temperature. For example, the contact sensor (e.g., a wire) can be formed from a material having a high temperature coefficient of resistance (TCR). Materials having a relatively high TCR provide for enhanced temperature and temperature change sensing by the contact sensor. Suitable materials include, but are not limited, metals such as Pt, Ru, Cu, Au, Al, W, Ni, NiFe, and Mo. Other non-metal materials may also be used, such as carbon nanotubes, indium tin oxide (ITO), Poly(3,4-ethylenedioxythiophene) (PEDOT), poly (styrene sulfonate) PSS, and graphene.

According to some embodiments, a detector is configured to measure the rate of change in resistance (dR) of the contact sensor and the rate of change in heater power (dP). The change in resistance and the change in heater power can be used to produce a detection metric by the detector. For example, using the ratio of the rate of change in resistance (dR) to the rate of change in heater power (dP), referred to as dR/dP, changes in head-medium spacing and head-medium contact can be detected. The metric dR/dP decreases generally linearly with decreasing head-to media clearance. Detecting a deviation from linearity in dR/dP and a minima indicates head-media contact and head-media caused cooling and frictional heating.

It has been observed that some HAMR head designs have a contact sensor (e.g., a DETCR) that does not experience a significant change in heating and cooling during normal oscillating heater contact detection (e.g., LFACH). When the heating amplitude is low, the maximum contact sensor signal is also low, and identifying head-medium contact is more challenging. A possible solution to this problem is to change the slider design to provide more direct heating of the contact sensor by the main heater used for contact detection. However, the primary function of a read-write transducer is not performing contact detection, so this solution (changing the transducer's heater design to perform a test function) reduces the available design space for the transducer's main functions: setting clearance for, and then performing, reading and writing. By increasing the contact sensor signal according to the present disclosure, a significant improvement in contact detection efficacy can be realized, particularly for devices having a low- and non-modulation air bearing.

Figures 2A, 2B:
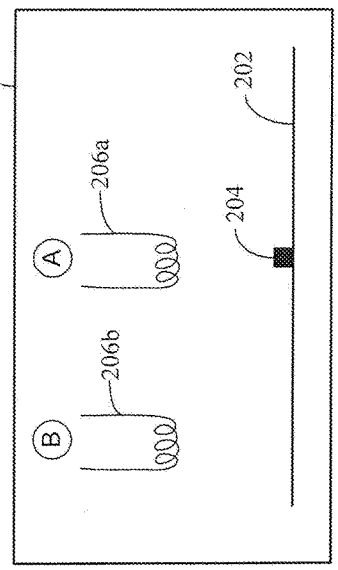
FIG. 2A is a graph showing two sets of contact sensor signals as a function of writer heater power for the heater scenarios A and B shown in FIG. 2B.
FIG. 2B shows a portion of a slider which includes a contact sensor subject to heating by heaters situated at different locations within the slider.

FIG. 2A is a graph showing two sets of contact sensor signals (dR/dP) as a function of writer heater power (mW) for the heater scenarios A and B shown in FIG. 2B. In FIG. 2B, a portion of a slider 200 is shown which includes a contact sensor 204 situated at or near an air bearing surface 202 of the slider 200. According to a first slider design, a heater 206a is positioned above and in vertical alignment with the contact sensor 204 (heater scenario A). According to a second slider design, a heater 206b is positioned above and to the side of the contact sensor 204. As such, the contact sensor 204 is closer to the heater 206a in heater scenario A than to the heater 206b in heater scenario B. It is noted that the heaters 206a and 206b represent the main heaters used for contact detection, which may be a writer heater or a reader heater. Differences in the proximity between the contact sensor 204 and the heaters 206a and 206b impacts the initial magnitude of the contact sensor signal (points 210 and 212), the slope of the dR/dP curve, and the sharpness of the inflection at the dR/dP (dR/dP$_{MIN}$) minima indicating head-media contact.

In FIG. 2A, the contact sensor signal curve A (curve A) corresponds to the heater scenario A shown in FIG. 2B. The contact sensor signal curve B (curve B) corresponds to the heater scenario B shown in FIG. 2B. As can be seen in FIG. 2A, the initial magnitude (point 210) of curve A is substantially larger than the initial magnitude (point 212) of curve B. It can also be seen in FIG. 2A that the slope of curve A is steeper than that of curve B. It can further be seen in FIG. 2A that the inflection at dR/dP$_{MIN}$ is sharper for curve A than for curve B. It can be appreciated that heater scenario A produces a contact sensor signal that is superior to that produced by heater scenario B for purposes of detecting head-medium contact.

In some slider designs, it may not be possible to position the main heater used for contact detection in a preferred location (e.g., heater scenario A) relative to the contact sensor 204. Due to design constraints, for example, a particular slider design may have to implement the less desirable heater scenario B shown in FIG. 2B. According to various embodiments, one or more supplemental heat generating components of the slider can be activated in addition to the main heater used for contact detection to produce a contact sensor signal having an increased initial magnitude, steeper slope, and sharper inflection at the dR/dP minima. For example, the heater scenario B shown in FIG. 2B can produce a contact sensor signal similar to that of curve A by activation of one or more supplemental heat generating components of the slider in addition to the main heater according to embodiments of the disclosure.

Figure 3:
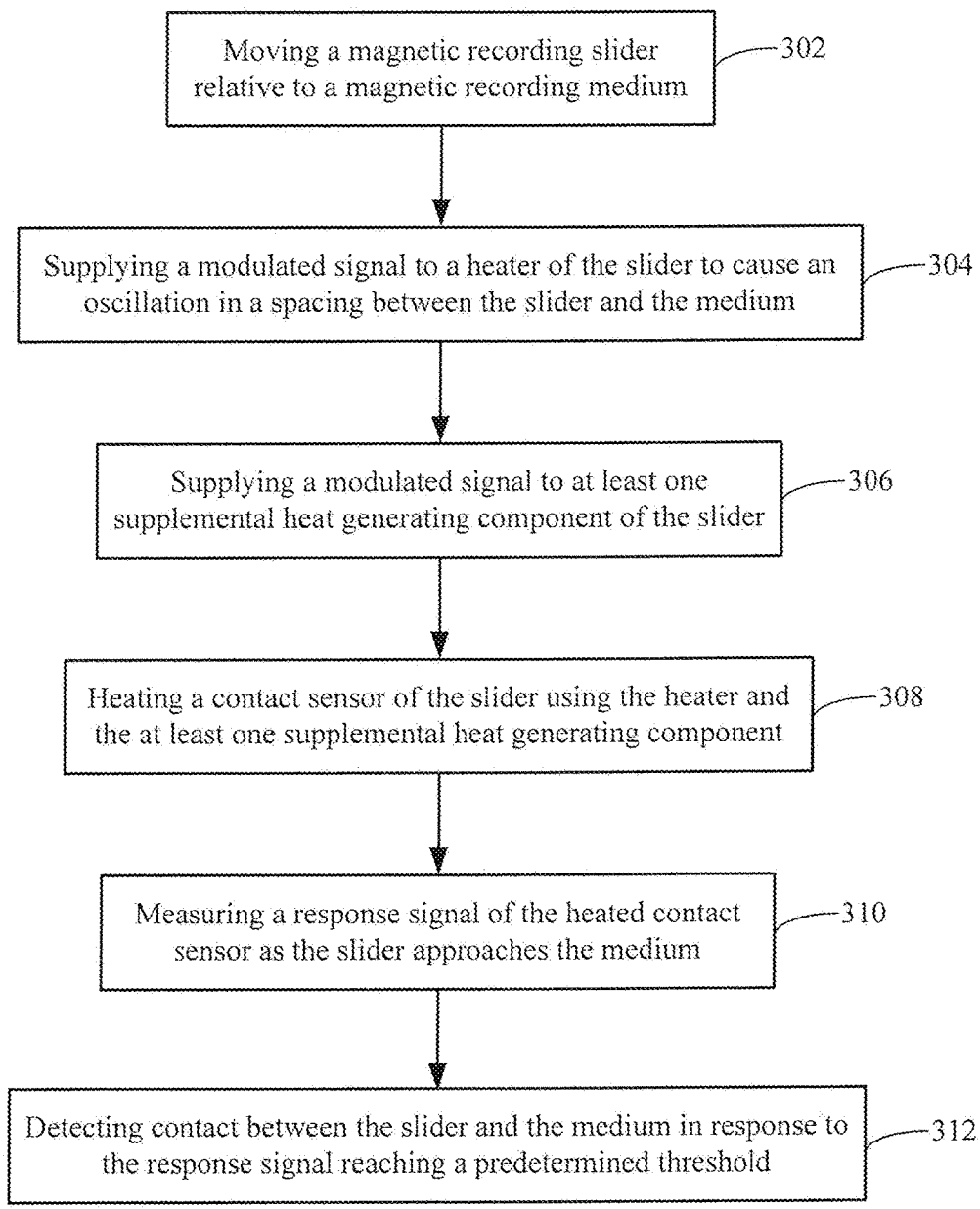
FIG. 3 illustrates a method of increasing the magnitude of the signal produced by a contact sensor of a slider using a multiplicity of heat generating components of the slider in accordance with various embodiments.

FIG. 3 illustrates a method of increasing the magnitude of the signal produced by a contact sensor of a slider using a multiplicity of heat generating components of the slider in accordance with various embodiments. The method shown in FIG. 3 involves moving 302 a magnetic recording slider relative to a magnetic recording medium. The method involves supplying 304 a modulated signal to a heater of the slider to cause an oscillation in a spacing between the slider in the medium. The method also involves supplying 306 a modulated signal to at least one supplemental heat generating component of the slider. The method involves heating 308 a contact sensor of the slider using the heater and the at least one supplemental heat generating component. The method also involves measuring 310 a response signal of the heated contact sensor as the slider approaches the medium. The method further involves detecting 312 contact between the slider and the medium in response to the response signal reaching a predetermined threshold. The predetermined threshold may be a minima of the response signal. In some embodiments, the predetermined threshold can be a percentage change, a fixed change, or a specified deviation (e.g., >n sigma) in the response signal.

Figure 4A:
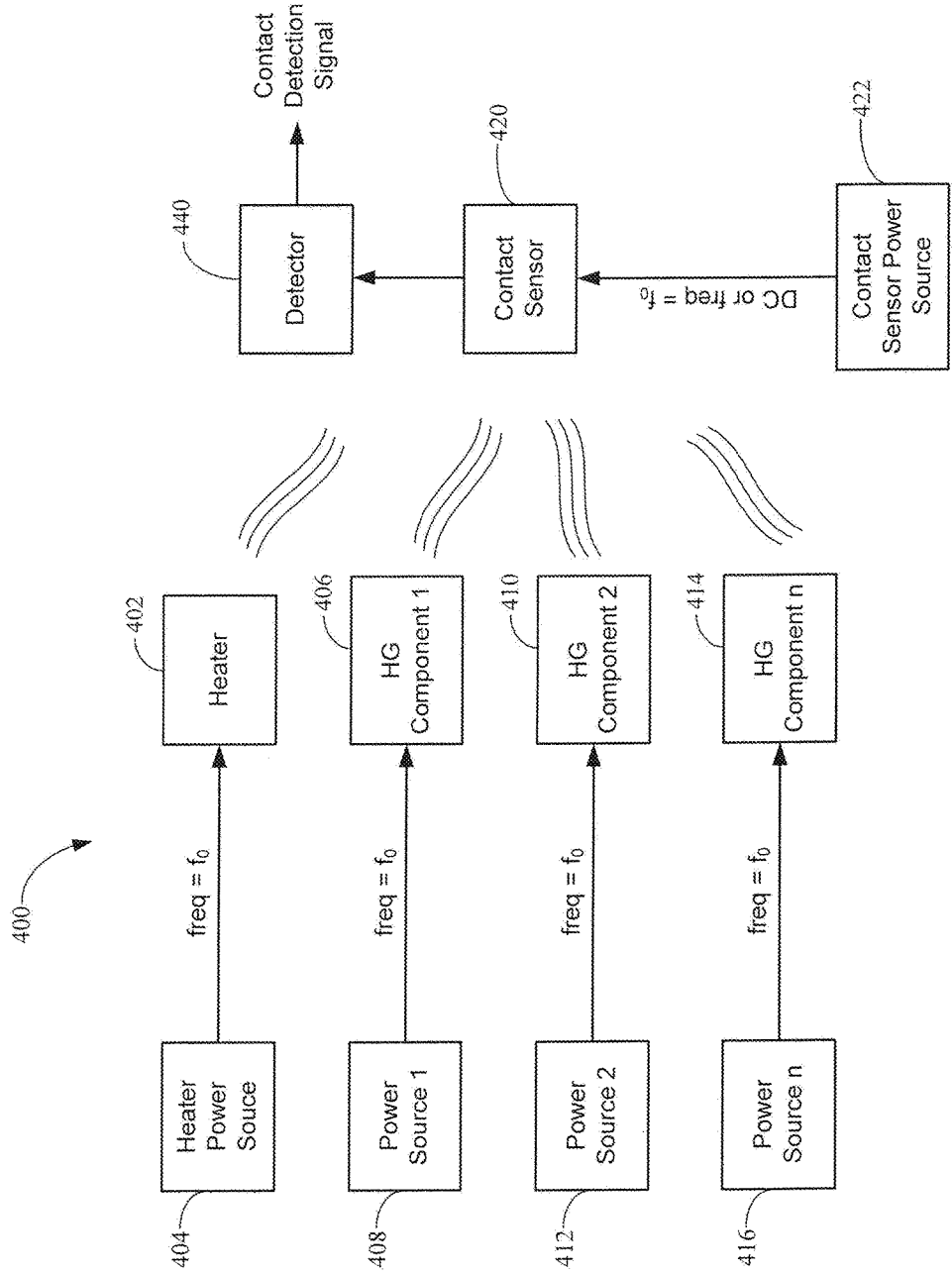
FIG. 4A illustrates various components of a magnetic recording slider which can be used to perform contact detection in accordance with various embodiments.

FIG. 4A illustrates various components of a magnetic recording slider 400 which can be used to perform contact detection in accordance with various embodiments. FIG. 4A shows a contact sensor 420 which is situated at or near an air bearing surface of the slider. The contact sensor 420 is coupled to a power source 422 which is configured to bias the contact sensor 420 during operation. An output of the contact sensor 420 is coupled to a detector 440, which is a component external to the slider 400. A heater 402 is coupled to a heater power source 404. The heater 402 shown in FIG. 4A represents the main heater of the slider 400 that is used for contact detection. The heater 402 may, for example, be a writer heater, but may alternatively be a reader heater or other heater of the slider. The slider, for example, may include a number of different close points each of which may have an associated heater. Contact detection can be conducted at any of the different close points with use of its associated heater.

The heater power source 404 is configured to supply a modulated signal to the heater 402 to cause an oscillation in a spacing between the slider 400 and a magnetic recording medium. As shown, the modulated signal has a frequency of $f_0$. The modulation frequency, $f_0$, can be any frequency suitable for performing contact detection using an LFACH technique. For example, the modulation frequency, $f_0$, can be a frequency less than about 3 kHz, such as about 1800 kHz. It is noted that the contact sensor 420 can be biased by the contact sensor power source 422 using a DC signal or a modulated signal having a frequency, $f_0$, equal to that supplied to the heater 402.

During contact detection, the heater 402 is activated in response to the modulated signal produced by the heater power source 404. Heater power is increased during the contact detection procedure, typically in steps referred to as heater DACs (digital-to-analog-converter steps). As heater power is increased, a protrusion of the slider 400 at the air bearing surface expands such that the slider 400 approaches the recording medium. As the slider 400 approaches the recording medium, a contact sensor signal (dR/dP) is measured by the detector 440 until a minima of the contact sensor signal is detected, indicating contact between the slider 400 and the medium (see, e.g., FIG. 2A).

According to various embodiments, the magnitude of the contact sensor signal (dR/dP) can be increased by heating the contact sensor 420 using at least one supplemental heat generating component of the slider 400 in addition to the heater 402. The additional heating of the contact sensor 420 by one or more supplemental heat generating components of the slider 400 serves to increase the resistance changes (dR) of the contact sensor 420. This increase in the contact sensor resistance changes (dR) results in an increase in the magnitude of the contact sensor signal (dR/dP). A supplemental heat generating component of the slider 400 may be operated in a manner to provide very little change in protrusion at the air bearing surface (<5-10%) when warming the contact sensor 420 during a contact detection procedure.

With continued reference to FIG. 4A, the slider 400 may include a first heat generating component 406 coupled to a first power source 408, and a second heat generating component 410 coupled to a second power source 412. The slider 400 may include other heat generating components, collectively indicated as heat generating component n 414 coupled to a power source n 416. The first heat generating component 406 may, for example, be a writer of the slider 400. The writer 406 can be activated by the first power source 408 to generate heat during the contact detection procedure. Heat generated by the writer 406 is conducted to the contact sensor 420, thereby further increasing the temperature of the contact sensor 420.

The second heat generating component 410 may, for example, be a secondary heater of the slider 400. If the main heater 402 is a writer heater, for example, the secondary heater 410 may be a reader heater or other heater of the slider 400. Heat generated by the secondary heater 410 is also conducted to the contact sensor 420, thereby further increasing the temperature of the contact sensor 420. A third heat generating component 414, indicated as component n in FIG. 4A, may be a laser diode of or coupled to the slider 400. Heat generated by the laser diode 414 (via an optical waveguide and/or a near-field transducer) is also conducted to the contact sensor 420, thereby further increasing the temperature of the contact sensor 420. As was discussed previously, heating the contact sensor 420 by one or more of the supplemental heat generating components 406, 410, 414 of the slider 400 produces a contact sensor signal having an increased initial magnitude, steeper slope, and sharper inflection at the dR/dP minima as compared to a contact sensor signal produced by the contact sensor 420 heated only by the main heater 402.

In the embodiment shown in FIG. 4A, the heater 402 and one or more of the supplemental heat generating components 406, 410, and 414 are activated synchronously and at the same frequency (e.g., $f_0$). According to some embodiments, the heater 402 and one or more of the supplemental heat generating components 406, 410, and 414 are activated synchronously but can be modulated at different frequencies. In the case of modulating synchronously at different frequencies, the higher frequencies should be integer multiples of the lowest frequency so that, during the oscillations, the thermal wavefronts from the different heat generating components 402, 406, 410, and 414 line up to provide maximum constructive interference. It may be desirable to provide a relative phase adjustment capability (see following discussion) when modulating multiple heat sources synchronously at different frequencies. It has been demonstrated that synchronously modulating the heater 402 and one or more of the supplemental heat generating components 406, 410, and 414 increases the magnitude of the modulated heat that reaches the contact sensor 420 and results in a significantly larger contact sensor signal.

Figure 4B:
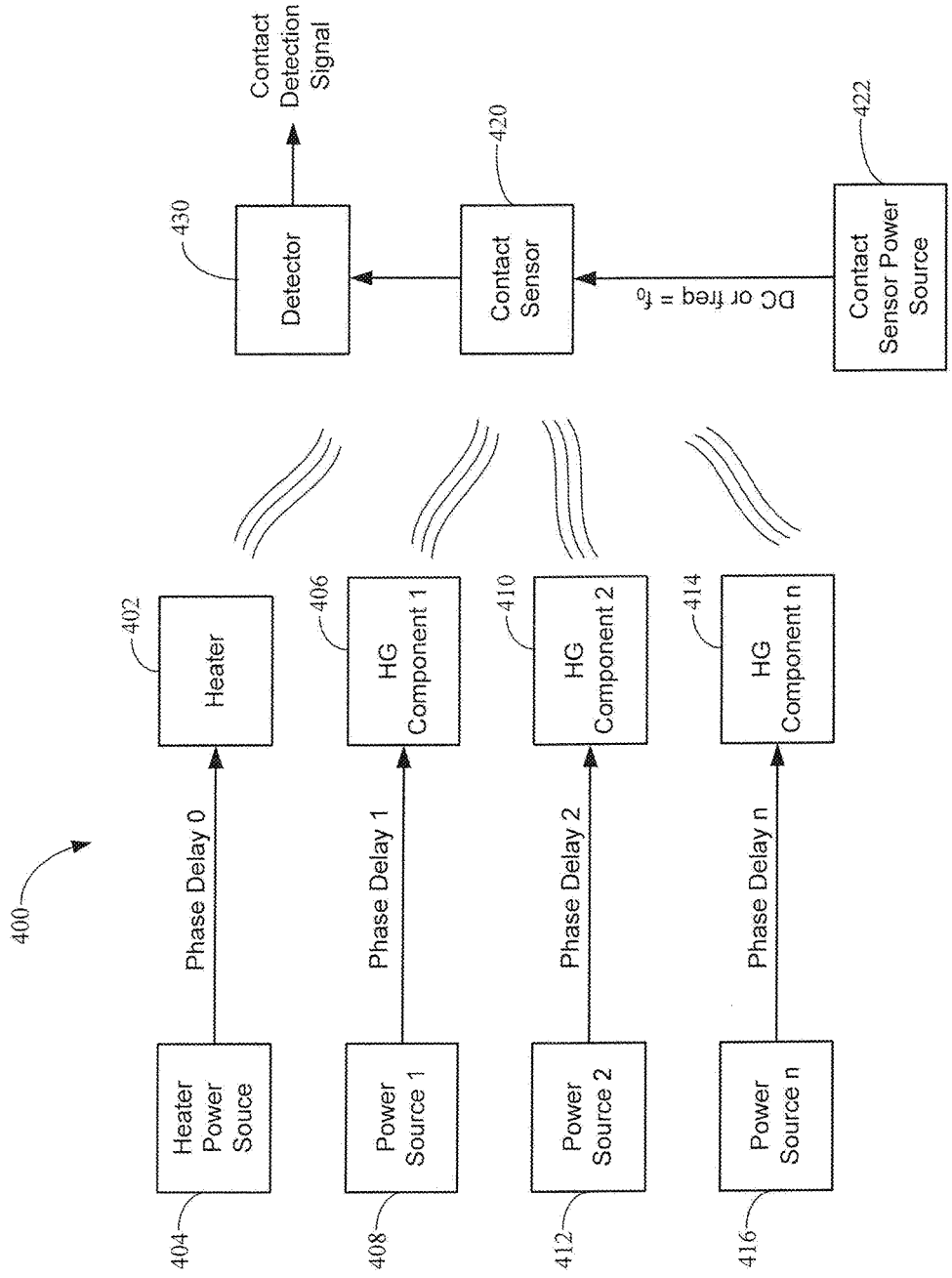
FIG. 4B illustrates various components of a magnetic recording slider which can be used to perform contact detection in accordance with various embodiments.

FIG. 4B shows the same components of the slider 400 shown in FIG. 4A. FIG. 4B differs from FIG. 4A in that the various heat generating components of the slider 400 can be modulated asynchronously or in a phase-delayed manner. For example, and with reference to FIG. 4B, activation of the heater 402 and one or more of the heat generating components 406, 410, and 414 can be phase delayed so that heat generated from each of these components arrives at the contact sensor 420 at the same time. The time for a thermal disturbance to travel from one of the heat generating components 402, 406, 410, and 414 to the contact sensor 420 depends on the conductance and thermal capacitance of the pathway between these components and the contact sensor 420. Different heat generating components have different pathways with different time constants. The introduction of a phase difference in the source input currents produced by the power sources 404, 408, 412, and 416 can enable temporal alignment of the arrival of thermal wavefronts from the separate heat generating components 402, 406, 410, and 414. Introducing a phase delay to the modulated signals produced by the power sources 404, 408, 412, 416 as shown in FIG. 4B provides for tuning to increase constructive interference, thereby improving the synchronized addition of the heat generating sources to increase the magnitude of resistance changes of the contact sensor 420.

Figure 5:
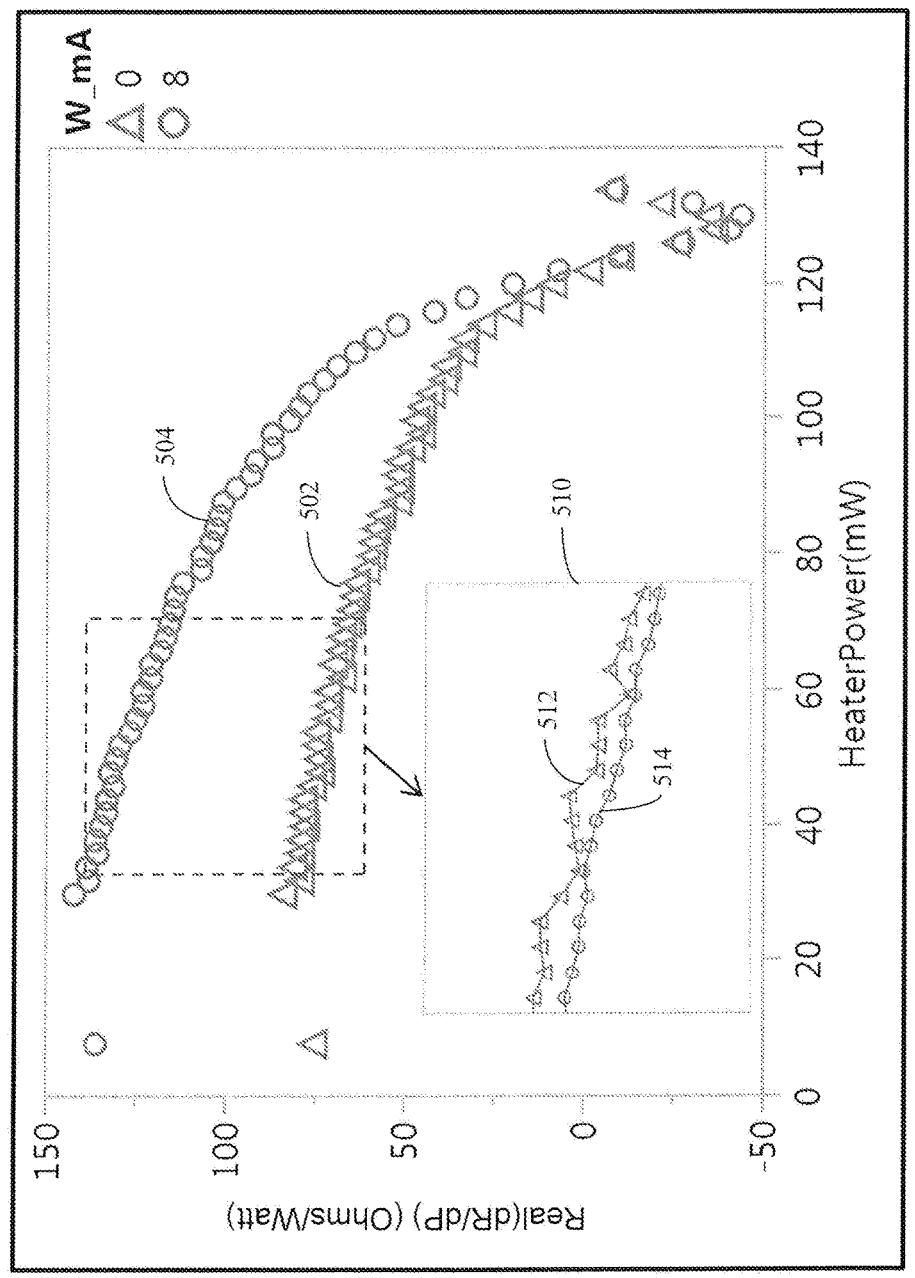
FIG. 5 shows data for two different contact detection procedures, one of which involves a multiplicity of heat generating components of the slider in accordance with various embodiments.

FIG. 5 shows data for two different contact detection procedures. The contact sensor signals (dR/dP) for the two procedures are plotted as a function of heater power (mW) in FIG. 5. The curve 502 shows the contact sensor signal during a conventional contact detection procedure in which only the main heater is activated during the procedure. It can be seen that the initial contact sensor signal at a heater power of about 35 mW is approximately 80 (Ohms/Watt). The curve 504 shows the contact sensor signal during a contact detection procedure in which one or more supplemental heat generating components of the slider are activated in addition to the main heater. More particularly, curve 504 shows the contact sensor signal when the writer of the slider is modulated synchronously with the main heater. For curve 504, the writer current was 50 mA with a modulation of 8 mA peak-to-peak. For curve 502, the writer current was not modulated. It can be seen that the initial contact sensor signal for curve 504 at a heater power of about 35 mW is approximately 145 (Ohms/Watt). The substantial increase in the initial contact sensor signal of curve 504 relative to 502 is due to the increased change in resistance (dR) of the contact sensor resulting from the additional heating by the writer.

In addition to increasing the contact detection signal (dR/dP) by the additional heat produced by the writer, a reduction in the contact detection curve noise is also realized. This can be seen in the insert 510 shown in FIG. 5. Curve 512 shows a portion of the contact sensor signal during a conventional contact detection procedure in which only the main heater is activated during the procedure. Curve 514 shows a portion of the contact sensor signal when the writer of the slider is modulated synchronously with the main heater. An ideal dR/dP curve would be smooth all the way to contact. Deviation from smoothness is considered to be noise. The zoomed-in view of insert 510 shows a difference in smoothness between curves 512 and 514, with curve 514 being smoother and thus better.

Figure 6:
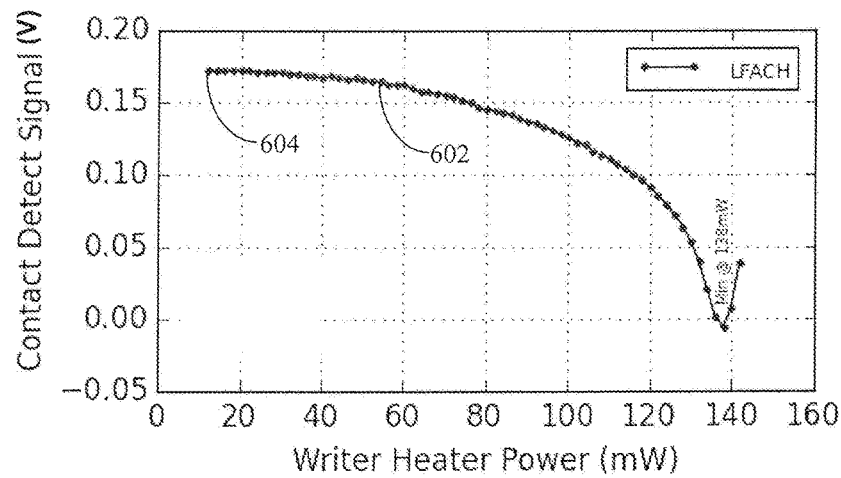
FIG. 6 is a power-to-contact curve for a conventional contact detection procedure.
Figure 7:
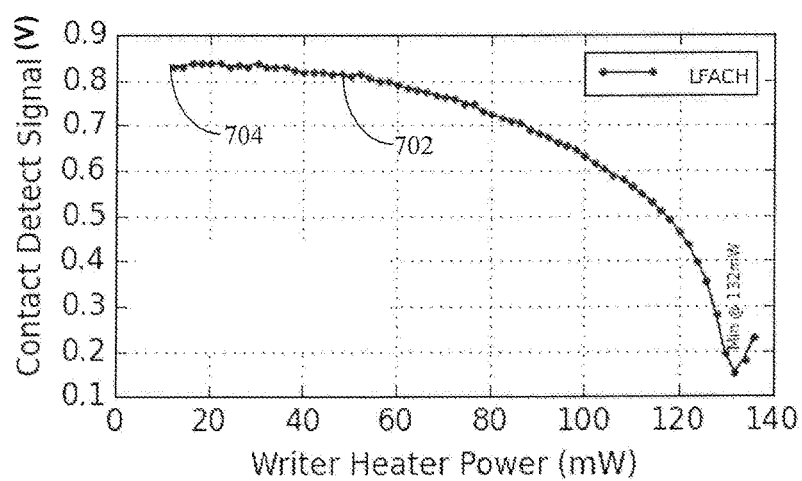
FIG. 7 is a power-to-contact curve for a contact detection procedure involving a multiplicity of heat generating components of the slider in accordance with various embodiments.
Figure 8:
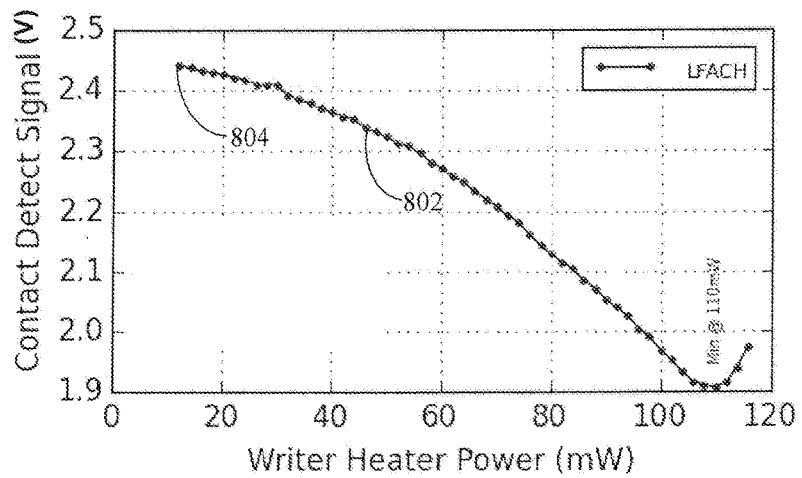
FIG. 8 is a power-to-contact curve for a contact detection procedure involving a multiplicity of heat generating components of the slider in accordance with various embodiments.

FIGS. 6-8 are power-to-contact curves for three different contact detection procedures. In FIGS. 6-8, the contact sensor signal (dR/dP) is plotted as a function of writer heater power (mW). The contact detection procedure that produced the data shown in FIG. 6 involved heating of the contact sensor only by the writer heater. It can be seen that the contact sensor signal curve 602 has an initial contact sensor signal magnitude (sample 604) of about 0.17 V. The contact detection procedure that produced the data shown in FIG. 7 involved heating of the contact sensor by the writer heater and the writer of the slider. It can be seen that the contact sensor signal curve 702 has an initial contact sensor signal magnitude (sample 704) of about 0.83 V, which is significantly higher than that of curve 602 (i.e. 0.17 V) shown in FIG. 6. The contact detection procedure that produced the data shown in FIG. 8 involved heating of the contact sensor by the writer heater, the writer, and the laser diode coupled to the slider. It can be seen that the contact sensor signal curve 802 has an initial contact sensor signal magnitude (sample 804) of about 2.45 V, which is significantly higher than that of curves 602 (i.e. 0.17 V) and 702 (i.e. 0.83 V). It is noted that use of the laser diode for heating the contact sensor is generally reserved for performing a laser-on contact detection form of writer contact detection.

FIGS. 6-8 demonstrate that supplemental heating of the contact sensor by the writer or the writer+laser diode results in a contact detection signal having a magnitude significantly larger than that of contact detection signal produced when only the main heater of the slider is activated. FIGS. 6-8 demonstrate that superior contact detection signals can be produced for contact detection procedures by heating the contact sensor using one or more supplemental heat generating components of the slider in addition to the main heater used for contact detection.

Figure 9:
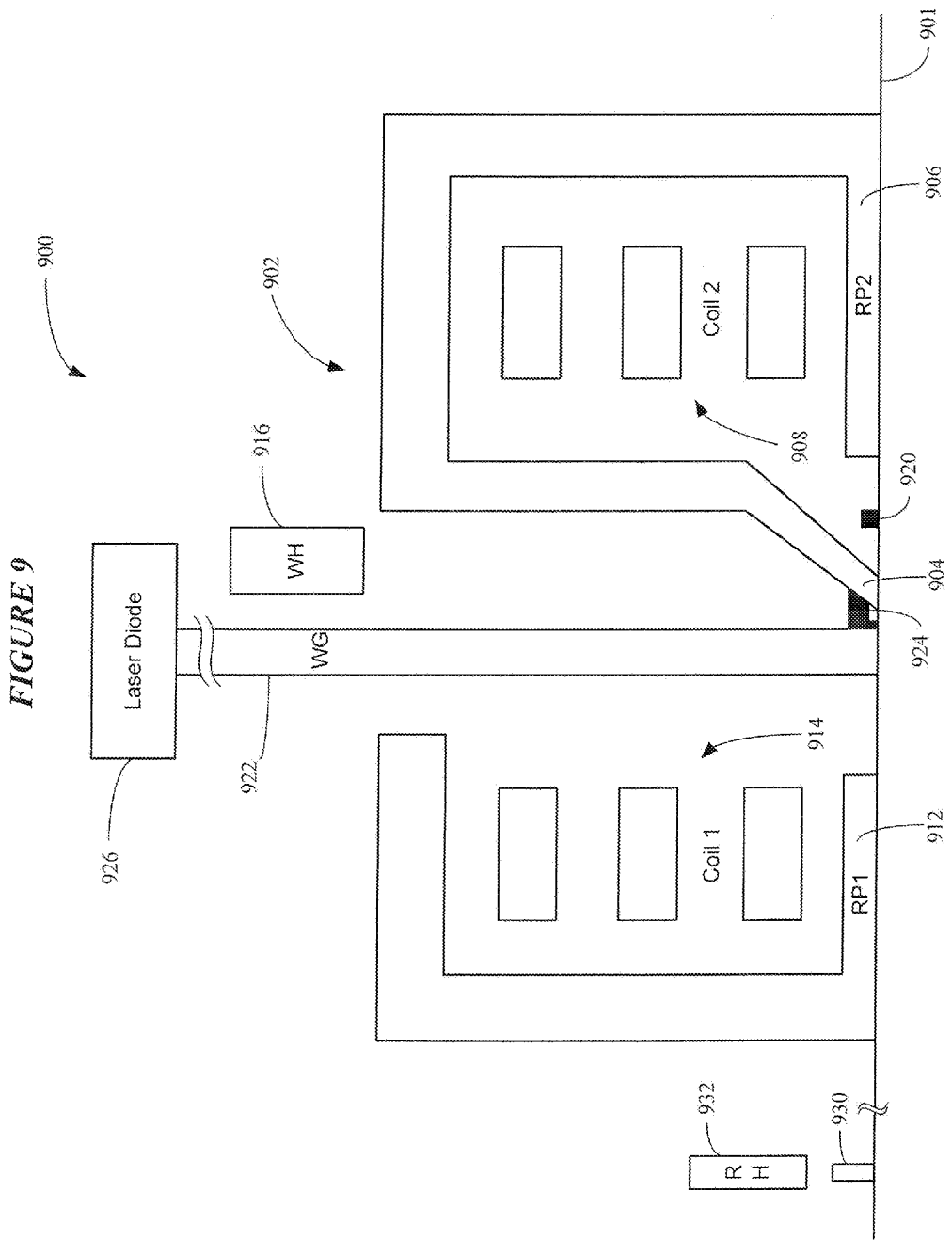
FIG. 9 is a schematic illustration of various components of a magnetic recording slider with which embodiments of the disclosure can be implemented.

FIG. 9 is a schematic illustration of various components of a magnetic recording slider 900 with which embodiments of the disclosure can be implemented. The slider 900 shown in FIG. 9 represents one of many possible HAMR slider configurations. The portion of the slider 900 shown in FIG. 9 includes an air bearing surface 901. The slider 900 includes a writer 902 having a first return pole 912, a second return pole 906, and a write pole 904 terminating at or near the ABS 901. The writer 902 includes a first coil 914 and a second coil 908. It is noted that the magnetic structures of the writer 902 shown in FIG. 9 are coupled together using one or more magnetic vias (not shown). A writer heater 916 is situated proximate the writer 902. The writer heater 916 is configured to thermally actuate the writer 902 at appropriate times, such as during write operations and when setting clearance. A reader 930 is situated at or near the ABS 901 and spaced apart from the writer 902. A reader heater 932 is situated proximate the reader 930, and is configured to thermally actuate the reader 930 at appropriate times (e.g., during read operations and when setting clearance). In some embodiments, the reader heater 932 can serve as a supplemental heater during a contact detection procedure.

A contact sensor 920 (e.g., a DETCR or other thermal sensor) is shown situated at or near the ABS 901 within a gap between the write pole 904 and the second return pole 906. It is understood that the contact sensor 920 can be situated elsewhere on the slider 900, such as between the first return pole 912 and an optical waveguide 922 of the slider 900.

The optical waveguide 922 extends through the body of the slider 900 and terminates at or near the ABS 901 proximate an NFT 924. A laser diode 926 can be incorporated within or coupled to the slider 900. For example, the laser diode 926 may be an integral, edge firing device or a surface emitting laser (SEL). Light from the laser diode 926 propagates along the waveguide 922 to the NFT 924, e.g., either directly from the laser diode 926 or through a mode converter or by way of a focusing element. When writing to a recording medium using the slider 900, electromagnetic energy is concentrated onto a small hotspot over a track of the recording medium where writing takes place. As a result of what is known as the diffraction limit, optical components cannot be used to focus light to a dimension that is less than about half the wavelength of the light. The laser diodes used in some HAMR designs produce light with wavelengths on the order of 700-1550 nm, yet the desired hotspot is on the order of 50 nm or less. Thus, the desired hotspot size is well below half the wavelength of the light. Optical focusers cannot be used to obtain the desired hotspot size, being diffraction limited at this scale. As a result, the NFT 924 is employed to create a hotspot on the recording medium.

The NFT 924 is a near-field optics device configured to generate local surface plasmon resonance at a designated (e.g., design) wavelength. The NFT 924 is generally formed from a thin film of plasmonic material on a substrate. The waveguide 922 and optional mode converter and/or other optical element directs electromagnetic energy (e.g., laser light) onto the NFT 924. The NFT 924 achieves surface plasmon resonance in response to the incident electromagnetic energy. The plasmons generated by this resonance are emitted from the NFT 924 towards the recording medium where they are absorbed to create a hotspot. At resonance, a high electric field surrounds the NFT 924 due to the collective oscillations of electrons at the metal surface (e.g., substrate) of the recording medium. At least a portion of the electric field surrounding the NFT 924 gets absorbed by the recording medium, thereby raising the temperature of a spot on the medium as data is being recorded.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
moving a magnetic recording slider relative to a magnetic recording medium;
supplying a modulated signal to a heater of the slider to cause an oscillation in a spacing between the slider and the medium;
supplying a modulated signal to at least one supplemental heat generating component of the slider;
heating a contact sensor of the slider using the heater and the at least one supplemental heat generating component;
measuring a response signal of the heated contact sensor as the slider approaches the medium; and detecting contact between the slider and the medium in response to the response signal reaching a predetermined threshold.

2. The method of claim 1, wherein heating the contact sensor comprises heating the contact sensor using a plurality of supplemental heat generating components of the slider.

3. The method of claim 1, wherein the at least one supplemental heat generating component comprises a writer.

4. The method of claim 1, wherein the at least one supplemental heat generating component comprises another heater.

5. The method of claim 1, wherein the at least one supplemental heat generating component comprises a laser diode of or coupled to the slider.

6. The method of claim 1, wherein the at least one supplemental heat generating component comprises writer and a laser diode of or coupled to the slider.

7. The method of claim 1, wherein the modulated signal supplied to the heater is synchronous with the modulated signal supplied to the at least one supplemental heat generating component.

8. The method of claim 1, wherein the modulated signal supplied to the heater is asynchronous with the modulated signal supplied to the at least one supplemental heat generating component.

9. The method of claim 1, comprising supplying a DC bias signal to the contact sensor.

10. The method of claim 1, comprising supplying a modulated bias signal to the contact sensor that is synchronous with the modulated signal supplied to the heater.

11. An apparatus, comprising:
 a slider configured for writing data to and reading data from a magnetic recording medium, the slider comprising:
  a heater configured to receive a modulated signal and cause oscillation in a spacing between the slider and the medium;
  at least one heat generating component configured to receive a modulated signal; and
  a contact sensor situated on the slider to receive heat generated by the heater and the at least one heat generating component; and
 a detector coupled to the slider and configured to measure a response signal of the heated contact sensor as the slider approaches the medium, the detector further configured to detect contact between the slider and the medium in response to the response signal reaching a predetermined threshold.

12. The apparatus of claim 11, wherein:
 the slider comprises a plurality of supplemental heat generating components; and
 the contact sensor is situated on the slider to receive heat generated by the plurality of heat generating components.

13. The apparatus of claim 11, wherein the at least one supplemental heat generating component comprises a writer.

14. The apparatus of claim 11, wherein the at least one supplemental heat generating component comprises another heater.

15. The apparatus of claim 11, wherein the at least one supplemental heat generating component comprises a laser diode of or coupled to the slider.

16. The apparatus of claim 11, wherein the at least one supplemental heat generating component comprises writer and a laser diode of or coupled to the slider.

17. The apparatus of claim 11, wherein the modulated signal supplied to the heater is synchronous with the modulated signal supplied to the at least one supplemental heat generating component.

18. The apparatus of claim 11, wherein the modulated signal supplied to the heater is asynchronous with the modulated signal supplied to the at least one supplemental heat generating component.

19. The apparatus of claim 11, wherein the contact sensor is configured to receive a DC bias signal.

20. The apparatus of claim 11, wherein the contact sensor is configured to receive a modulated bias signal synchronous with the modulated signal supplied to the heater.

* * * * *